(12) United States Patent
Gauerhof et al.

(10) Patent No.: US 11,709,242 B2
(45) Date of Patent: Jul. 25, 2023

(54) METHOD FOR DETECTING A LIVING BEING ON A SEAT OF A VEHICLE, DETECTION ARRANGEMENT AND VEHICLE

(71) Applicant: Brose Fahrzeugteile SE & Co. Kommanditgesellschaft, Bamberg, Bamberg (DE)

(72) Inventors: Sergej Gauerhof, Knetzgau (DE); Carsten Topf, Schonungen (DE); Wolfgang Uebel, Weitramsdorf (DE); Benjamin Gruenewald, Hassfurt (DE)

(73) Assignee: Brose Fahrzeugteile SE & Co. Kommanditgesellschaft, Bamberg

( * ) Notice: Subject to any disclaimer, the term of this patent is extended or adjusted under 35 U.S.C. 154(b) by 485 days.

(21) Appl. No.: 16/823,644

(22) Filed: Mar. 19, 2020

(65) Prior Publication Data
US 2020/0300997 A1 Sep. 24, 2020

(30) Foreign Application Priority Data

Mar. 19, 2019 (DE) ...................... 10 2019 203 688.0

(51) Int. Cl.
*G01S 13/04* (2006.01)
*G01S 15/04* (2006.01)
*G01V 8/12* (2006.01)

(52) U.S. Cl.
CPC .............. *G01S 13/04* (2013.01); *G01S 15/04* (2013.01); *G01V 8/12* (2013.01)

(58) Field of Classification Search
CPC .... B60R 21/0134; B60N 2/002; G06V 20/59; G06V 40/10; G06V 20/593; G06V 40/103;
(Continued)

(56) References Cited

U.S. PATENT DOCUMENTS 6,270,116 B1 8/2001 Breed et al.
6,474,683 B1 * 11/2002 Breed ................. B60N 2/0276
701/45
(Continued)

FOREIGN PATENT DOCUMENTS

DE 102017210342 A1 12/2017
DE 102017214009 A1 2/2019

*Primary Examiner* — Olumide Ajibade Akonai
(74) *Attorney, Agent, or Firm* — Dickinson Wright PLLC (57) ABSTRACT

A method for detecting a living being on a seat of a vehicle, further relating to a detection arrangement and to a vehicle. The method may include emitting electromagnetic waves at predetermined frequency or at a predetermined frequency band towards the seat by an electromagnetic radiator, receiving electromagnetic waves reflected on a surface by a sensor, detecting an object on the seat from a transit time of the emitted and the reflected electromagnetic waves between the radiator, the surface and the sensor by a detection device, detecting movements of the object from the reflected electromagnetic waves by the detection device if an object has been detected, determining from the detected movements of the object whether the detected object is a living being, and outputting a detection signal by way of the detection device if it has been determined that the detected object is a living being.

17 Claims, 3 Drawing Sheets

(58) Field of Classification Search
CPC ........ G06V 10/143; G06V 10/82; G06V 8/12;
G06V 8/005; G01S 13/04; G01S 13/931;
G01S 13/06; G01S 15/04; G01S 7/539;
G01S 13/32; G01S 13/56; G01S 15/32;
G01S 15/523; G01S 17/894; G01S 7/415;
G01S 13/88; G01S 15/88; G01S 17/88
See application file for complete search history.

(56) References Cited

U.S. PATENT DOCUMENTS

| | | | |
|---|---|---|---|
| 6,904,347 B1* | 6/2005 | Berenz | B60R 21/01552 |
| | | | 250/559.22 |
| 8,260,502 B2* | 9/2012 | Yonak | B60R 21/0134 |
| | | | 701/45 |
| 10,953,830 B1* | 3/2021 | Christensen | B60R 21/01554 |
| 2005/0006884 A1* | 1/2005 | Cooper | B60R 21/206 |
| | | | 280/735 |
| 2007/0120347 A1* | 5/2007 | Breed | B60N 2/002 |
| | | | 280/735 |
| 2007/0193811 A1* | 8/2007 | Breed | B60R 21/01552 |
| | | | 180/271 |
| 2017/0039835 A1 | 2/2017 | Brankovic et al. | |
| 2018/0170213 A1 | 6/2018 | Lu-Dac et al. | |
| 2019/0293171 A1* | 9/2019 | Cuddihy | F16H 63/48 |
| 2020/0041997 A1* | 2/2020 | Tuukkanen | G05D 1/0088 |
| 2020/0249337 A1* | 8/2020 | Darko | G01S 7/03 |

* cited by examiner

METHOD FOR DETECTING A LIVING BEING ON A SEAT OF A VEHICLE, DETECTION ARRANGEMENT AND VEHICLE

CROSS-REFERENCE TO RELATED APPLICATIONS

This application claims priority to German Patent Application No. DE 10 2019 203 688.0, filed on Mar. 19, 2019, the disclosure of which is hereby incorporated in its entirety by reference herein.

TECHNICAL FIELD

The present disclosure relates to a system and method to detect occupancy of a vehicle.

BACKGROUND

In the interior, passenger transport vehicles, such as automobiles, typically have front seats for the driver and a passenger and rear seats for transporting further people.

Modern vehicles usually have a ventilation and air-conditioning system so as to air-condition the interior to a temperature which is comfortable for the occupants. However, the operation of the ventilation and air-conditioning system is typically coupled to an operating state of the drive motor of the vehicle. If the drive motor is in an off state, the ventilation and air-conditioning system is generally also switched off automatically. As a result, the vehicle is exposed to the thermal influences of the environment, typically leading to a change in the temperature in the interior of the vehicle. In particular, during high external temperatures, and in particular during insolation, rapid heating of the interior of the vehicle takes place. Typically, the interior of the vehicle forms a type of greenhouse, in such a way that during insolation temperatures of over 50 degrees Celsius are reached there even at a comparatively low external temperature. If animals or people, in particular children, are enclosed in the interior at these temperatures, this can lead to serious harm to health.

SUMMARY

One or more objects of the present disclosure may be to provide a reliable and efficient method for detecting a living being on a seat of a vehicle.

According to one embodiment, a method for detecting a living being, in particular a person or a mammal, on a seat of a vehicle, is provided. The method may include in particular emitting electromagnetic waves or electromagnetic radiation of at least one predetermined frequency or at least one predetermined frequency band towards the seat by means of an electromagnetic radiator and receiving electromagnetic waves of radiation reflected on a surface by means of a sensor. By means of the radiator, electromagnetic waves, for example microwaves or radio waves, acoustic waves such as ultrasonic waves, or waves in the form of light, such as infrared radiation, are thus directed towards a seat or a region in which the seat is arranged. The electromagnetic waves reflected by the seat or by an object located on the seat, or generally the electromagnetic waves reflected by a surface in the seat region, are detected by the sensor, the sensor generating a sensor signal on the basis of the reflected electromagnetic waves or radiation, for example using an electric circuit. From the reflected waves, in particular a change in the frequency of the reflected waves by comparison with the electromagnetic waves emitted by the radiator or transmitter and/or a transit time of the waves from the transmitter to the surface and back to the sensor or receiver can be detected.

In one or more embodiments, an object on the seat is detected from the sensor signals or from a transit time of the emitted and the reflected electromagnetic waves between the radiator, the surface and the sensor by means of a detection device. For example, from the transit time, a distance between the sensor and a surface which reflects the waves emitted by the radiator can be determined, and the determined distance can be compared with a reference distance, the presence of an object being detected if the determined distance is less than the reference distance. In practice, the actual transit time may also be compared with a reference transit time, the presence of an object being detected if the actual transit time is less than a reference transit time. It is thus initially determined by a distance measurement whether any object other than the seat, such as an item, an animal or a person, is located in the seat region. If the presence of an object has been detected, movements of the object are detected by the detection device from the reflected electromagnetic or from the sensor signals, and it is determined from the detected movements of the object whether the detected object is a living being. The processing device thus only analyses the reflected electromagnetic waves or the sensor signals representing them for the presence of movements if it is been determined that an object is present on the seat. If it has been determined that the detected object is a living being, a detection signal is outputted by the detection device, for example in the form of an electric voltage above a predetermined threshold.

According to another embodiment, a detection arrangement for or in a vehicle. The detection arrangement may include at least one seat for a person, an electromagnetic radiator which is set up and arranged for emitting electromagnetic waves of at least one frequency or at least one frequency band towards the seat, a sensor which is arranged and set up to receive electromagnetic waves reflected by a surface, and a detection device connected to the sensor and the radiator and formed to carry out the steps of a method according to the present invention. As a result, the detection device is set up to detect an object on the seat from a transit time of the emitted and the reflected electromagnetic waves between the radiator, the surface and the sensor, to detect movements of the object from the reflected electromagnetic waves if an object has been detected, and to determine from the detected movements of the object whether the detected object is a living being. Further, the detection device is set up to output or generate a detection signal if it has been determined that the detected object is a living being.

According to yet another embodiment a vehicle, such as a motor vehicle, such as a car or a van, may be provided. The vehicle may include a detection arrangement according to the second aspect of the invention.

The method of detection may include cascaded detection in that the sensor data representing the reflected waves are initially only evaluated as to whether an object is actually present in the seat region, and only if this is the case is a further analysis performed as to whether the object is moving. In this case, the object can be classified as a living being. The classification may for example be provided by the detection device as an electrical signal, which can be used for example to trigger different warning functions of the vehicle. If no movements are detected, the object can be classified as a loading item, and this can also be provided as a signal by the detection device.

This cascaded process may improve the efficiency of the detection method, since the mere presence of an object can be determined comparatively rapidly and simply by a distance determination between the sensor and the surface from which the waves are reflected is evaluated by way of a determination of the transit time of the waves. This distance measurement may provide a comparatively high reliability level, since the size of relevant objects, such as people, such as babies and toddlers, is in a range which results in a sufficiently large change in distance from the reference distance, for example the distance between the seat surface and the sensor device, and is thus easily detectable, if the sensor device is arranged for example in the vehicle ceiling.

Advantageous configurations and developments can be derived from the further, dependent claims and from the description with reference to the drawings.

One embodiment of the method provides that a size of the object is determined from the reflected electromagnetic waves. Since the radiator irradiates the seat or seat region in a planar manner, a spatial extent of an object can be determined from the reflected waves received by the sensor or the corresponding sensor signals. By way of example, an area occupied by the object and located within a region irradiated by the waves emitted by the radiator can be determined from the reflected waves, and the size of the object can be determined from a comparison of the occupied area with a reference area.

As an example, movements of the object are only detected if the determined size of the object is less than a reference value for the size. Thus, a further checking step takes place before movements are detected, the size of the detected object as determined from the received reflected waves being compared with a reference size, and movements only being detected for "small objects", in other words objects of which the determined size is less than the reference size. This advantageously contributes to the possibility of determining more rapidly and simply whether an object requires further checking. For example, for adult people, who can generally make themselves noticeable or escape from the vehicle by themselves, detection of movements can be omitted and computational power can thus be saved.

As another example, the received reflected electromagnetic waves or the generated sensor signals can be filtered on the basis of the determined size of the object, and movements of the object can be detected from the filtered reflected electromagnetic waves. In particular, if it is determined that the detected object is of a size within a predetermined size range, received reflected electromagnetic waves of predetermined frequencies can be filtered out using analogue or digital signal filters. In this case, only the filtered waves or signals are analysed to detect movements. This may take into account of the fact that people perform different typical movements depending on size, resulting in typical frequencies of the reflected waves. As a result, the movement detection can be carried out particularly efficiently if only the typically occurring frequencies are initially analysed.

In another embodiment, the detection of movements of the object may include determining a relative speed between the sensor and the surface which reflects the electromagnetic waves emitted by the radiator. For example, it may be provided that a movement is detected if the relative speed is greater than a predetermined threshold. The relative speed may for example be determined from a change over time in the distance between the sensor and the irradiated surface or from a change in the transit time. A frequency shift or change between the emitted and reflected electromagnetic waves may also be detected. The relative speed can also be determined by other signal processing methods.

As an example, the determination as to whether the detected object is a living being may include analysing the reflected electromagnetic waves or the corresponding sensor signals in the time domain for the presence of predetermined patterns.

In one or more embodiment, during this analysis, the reflected electromagnetic waves are checked for the presence of one or more of the following reference patterns:

a) reference patterns representing breathing movements of people in predetermined age ranges; b) reference patterns representing breathing movements of pets. The age ranges mentioned in a) may for example be between 0 years and 1 year, between 1 year and 2 years, between 2 years and 3 years, between 3 years and 5 years, between 5 years and 10 years, and older than 10 years. Naturally, other age ranges are also conceivable.

By way of the comparison with reference patterns, a detected movement pattern can be assigned to a reference pattern, and a type or state of the movement can thus be determined. For example, the breathing frequency is approximately 40-45 breaths/min for newborns, approximately 35-40 breaths/min for infants, approximately 20-30 breaths/min for toddlers, approximately 16-25 breaths/min for children and approximately 12-18 breaths/min for adults. Particularly advantageously, the received reflected waves may be filtered for example by way of the determined size of the object, as described above, and a comparison only made with reference patterns which match the determined size of the object. This further improves the reliability and efficiency of the method. To determine whether a detected movement progression, represented by the reflected waves received in temporal succession, corresponds to or is sufficiently similar to a reference pattern, mathematical pattern recognition methods may be used, by means of which for example regularities in the signal progression can be detected.

In a further embodiment, the frequency of the electromagnetic waves emitted by the radiator is modulated. In particular, the frequency can be modulated in such a way that it rises linearly, optionally in discrete steps, and at a particular value abruptly falls back to the initial value again (sawtooth pattern), or in such a way that it alternately rises and falls with a constant rate of change. For example, the frequency may be modulated in a range between 77 GHz and 81 GHz. As a result of the modulation of the electromagnetic waves during steady emission of the waves, advantageously both the differential speed between the sensor and the irradiated surface and their absolute distance from one another can be determined simultaneously.

In one or more embodiments, the radiator may include a radar transmitter configured to emit radio waves or microwaves, and the sensor is set up to receive radio waves or microwaves.

In a further embodiment, the radiator has an ultrasonic transmitter for emitting electromagnetic waves in the ultrasonic range, and the sensor is set up to receive ultrasonic waves.

In a further embodiment, the radiator may have a lighting unit for emitting light that may be within the infrared range, and the sensor may have a photonic mixer detector as a receiver. A sensor device that may include a radiator and the sensor may be implemented as a ToF camera, where "ToF" stands for "time-of-flight".

The radiator and sensor may each be combined to form a joint sensor device, that may be attached inside the interior of the vehicle. The radiator and sensor may be oriented to face the seat or seating region. For example, the sensor device may be attached in the vehicle ceiling, on the dashboard, on a seat other than the seat to be irradiated, or on another interior design item of the vehicle.

One or more methods described herein may be used in a vehicle.

The above configurations and developments may be combined with one another as desired, within reason. Further possible configurations, developments and implementations of the invention comprise combinations, including those not explicitly mentioned, of features of the invention which are described above or in the following in relation to the embodiments. In particular, a person skilled in the art will also add individual aspects, as improvements or supplements, to each basic form of the present invention.

BRIEF DESCRIPTION OF THE DRAWINGS

In the following, the present invention is described in greater detail with reference to the embodiments specified in the schematic drawings, in which.

The accompanying drawings are intended to impart further understanding of the embodiments of the invention. They illustrate embodiments and serve, in connection with the description, to explain principles and concepts of the invention. Other embodiments and many of the stated advantages can be derived from the drawings. The elements of the drawings are not necessarily shown to scale with one another.

In the drawings, like, functionally equivalent and equivalently operating elements features and components are provided with like reference numerals in each case unless otherwise specified.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

US 2018/0170213 A1 describes detection of people in the vehicle using radar sensors, detection of a presence of an object and classification of the object as a living person taking place on the basis of a movement measurement in that a radar signal of the radar sensor is analysed in the time domain.

Figure 1:
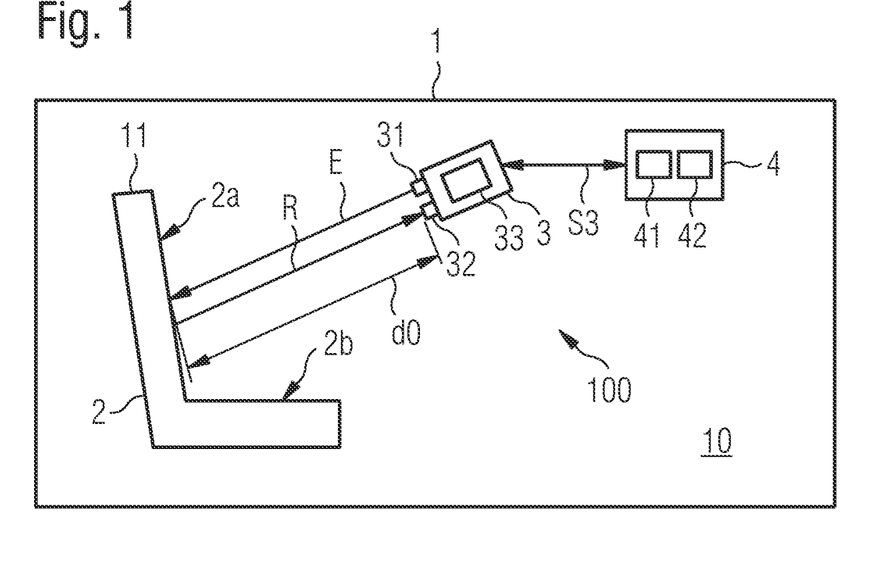
FIG. 1 is a schematic functional view of an interior of a vehicle in accordance with an embodiment of the present invention.

FIG. 1 shows a vehicle 1 purely schematically as a rectangular block. The vehicle 1 may in particular be a car or transporter or generally a passenger transport vehicle. The vehicle 1 has a detection arrangement comprising at least one seat 2 arranged in an interior 10 of the vehicle 1. This may be for example a rear seat of a back row of the vehicle 2. The detection device 100 further has a radiator 31 for emitting electromagnetic waves E, a sensor 32 for receiving or detecting reflected electromagnetic waves R, and a detection device 4.

As is schematically shown in FIG. 1, the radiator or transmitter 31 and the sensor or receiver 32 may be combined to form a sensor device 3. Further, an evaluation unit 33 for generating sensor signals S3 may be assigned to the sensor 32, or the sensor 31 may comprise said unit, for example in the form of an analogue circuit.

The radiator 31 is set up to emit electromagnetic waves of at least one frequency or at least one frequency band, and serves to emit electromagnetic waves E towards the at least one seat 2. For example, the radiator 31 may be formed as a radar transmitter for emitting radio waves or microwaves, as an ultrasonic transmitter for emitting waves in the ultrasonic range, or as an optical transmitter or lighting unit for emitting light waves, in particular in the infrared range. The radiator 31 may in particular itself be set up to generate electromagnetic waves.

Figure 2:
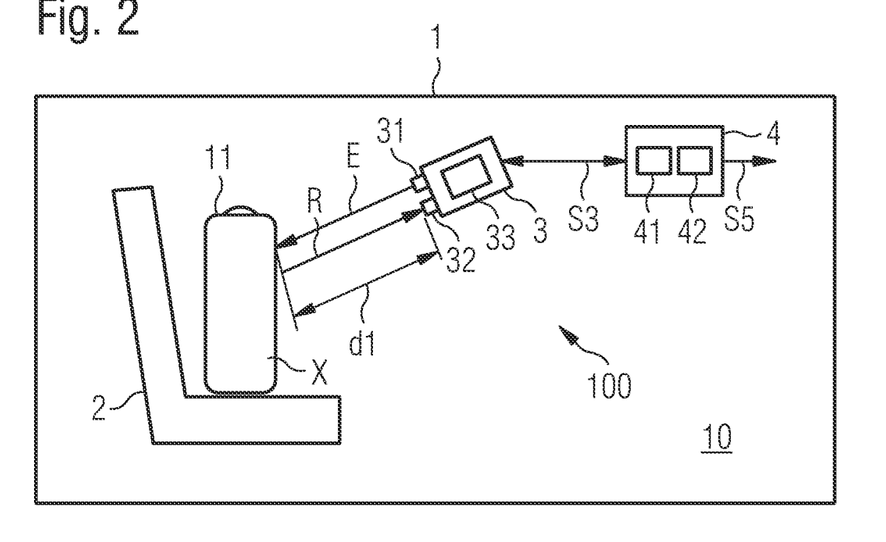
FIG. 2 shows the vehicle shown in FIG. 1 during a step of a method in accordance with an embodiment of the invention.

The sensor 32 is set up to receive reflected electromagnetic waves R which have been emitted by the radiator 31 and reflected on a surface 11. Corresponding to the radiator 31, the sensor 32 may be implemented as a radar receiver, as an ultrasonic receiver or as an optical receiver, as a photonic mixer detector. In the last of these cases, the sensor device 3 may be implemented using a ToF camera, where "ToF" stands for "time-of-flight". As is schematically shown in FIG. 1, the waves E emitted by the radiator 31 are directed onto one surface 11, in FIG. 1 by way of example a surface 2a of the seat 2. This surface 11 reflects at least some of the emitted waves E as reflected radiation or reflected electromagnetic waves R, which are detected by the sensor 32. By way of example and for reasons of clarity, FIG. 1 only shows irradiation of a small, discrete region of the surface 11. Preferably, however, electromagnetic waves are directed or emitted onto each of a seat surface region 2b and a surface 2a of a backrest of the seat 2, as is symbolically shown in FIGS. 2 and 4.

By means of the evaluation unit 33 of the sensor 31, a sensor signal S3 is generated from the received waves R. The sensor signal S3 may for example represent a transit time or transit length which the waves E, R require for the path from the radiator 31 to the surface 11 and back to the receiver 32 and/or a frequency of the reflected waves R and optionally of the emitted waves E. Thus, a distance d1 between the surface 11 and the sensor device 3 or sensor 32, and optionally a differential speed, a change in the distance d1, can be determined from the sensor signal S3. The evaluation unit 33 is connected to the sensor 32 and optionally also to the radiator 31.

The detection device 4 is set up to process the sensor signals S3, and connected for this purpose to the sensor device 3 or to the radiator 31 and sensor 32, for example via the evaluation unit 33 by means of a wired or wireless communications interface (not shown). As is schematically shown in FIG. 1, the detection device 4 may be set up for digital data processing and have a processor 41, such as a CPU, and a data memory 41, such as a non-volatile data memory, such as a flash memory or a hard disk. Further, the processing device 4 may also have an analogue-digital converter (not shown) so as to convert the received sensor signals S3 into digital signals if the sensor signals S3 are provided by the evaluation unit 33 as analogue signals.

The detection device 4 may be configured to carry out a method which is explained in the following by way of example with reference to FIG. 1 to 6. In this context, the detection device 4 or a control device (not shown) may be set up to generate control commands which cause the sensor device 3 to emit electromagnetic waves E.

In a first step of the method, electromagnetic waves E are emitted towards the seat 2, electromagnetic waves E of at least one frequency or at least one frequency band being emitted by means of the radiator 31. Optionally, the frequency of the emitted waves E is modulated, for example in a range between 77 GHz and 81 GHz. As was explained previously, the waves R reflected by the surface 11 are received by means of sensors 32, and the evaluation unit 33 generates corresponding sensor signals S3 which are conveyed to the detection device 4.

In a further step, the detection device 4 detects from the sensor signals S3 whether an object X is present on the seat 2. This is shown by way of example in FIG. 2, which shows a suitcase as the object X set down on the seat surface 2b of the seat 2. An object X is detected from a transit time of the emitted and the reflected electromagnetic waves E, R between the radiator 31, the surface 11, in FIG. 2 formed by the surface of the object X, and the sensor 32. A distance measurement or a distance comparison thus takes place. As can be seen in FIG. 1, which shows irradiation of the seat 2 without an object X, the sensor 32 is arranged at a reference distance d0 from the seat 2, such as from the surface 2a of the backrest of the seat 2. If no object X is located on the seat 2, the detection device 4 determines from the run time of the waves E, R that the surface 11 on which the waves E are reflected is arranged at a distance corresponding to the reference distance d0. In this context, the transit time of the waves E, R corresponds to a reference transit time. The reference distance d0 may include a particular tolerance, for example so as to take account of an adjustment of the seat 2. Further, the reference distance d0 may be recalibrated from time to time, for example when a door of the vehicle is opened. If an object X is present on the seat 2, such as a suitcase, as in FIGS. 2 and 3, or a baby in a child seat, as in FIG. 4, or an adult person, as in FIG. 5, a distance d1 from a surface 11 formed by the object X is detected which is smaller than the reference distance d0. In this context, the detection device 4 determines that the transit time of the waves E, R is less than the reference transit time.

Figure 3:
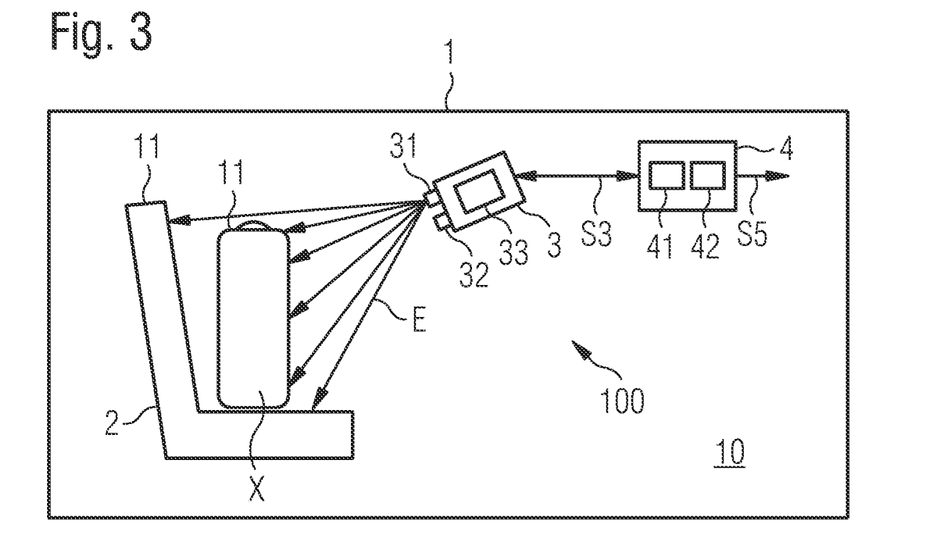
FIG. 3 shows the vehicle shown in FIG. 1 during a further step of the method in accordance with an embodiment of the invention.

FIG. 3 shows an optional step of the method for determining a size of the object X from the reflected electromagnetic waves R. As was explained above, electromagnetic waves E may be emitted onto the seat 2 in a planar manner, as is schematically shown in FIG. 3 by the plurality of arrows which symbolise the emitted waves E. If an object X is positioned on the seat 2, the emitted waves E are partially reflected by the surface 11 of the object X and on the surface 2a, 2b of the seat 2. Since this results in different transit times or distances between the sensor 32 and the reflected surface, it can be identified from the reflected waves R which regions of the surface 2a, 2b of the seat 2 are occupied by the object X. From this, the detection device 4 calculates an area occupied by the object X. To determine the size of the object X, the determined area can be compared with a reference area, for example the total area irradiated by the sensor device 3.

If the presence of an object X has been detected, the detection device 4 detects movements A1, A2, A3 of the object X from the sensor signals S3. This may for example comprise determining a relative speed between the sensor 32 and the surface 11 of the object X which reflects the waves E emitted by the radiator 31. For this purpose, the detection device 4 may apply conventional signal processing algorithms to the sensor signals S3. For example, a frequency shift between the emitted waves E and the reflected waves R can be detected by the detection device 4 to determine the relative speed.

Figure 5:
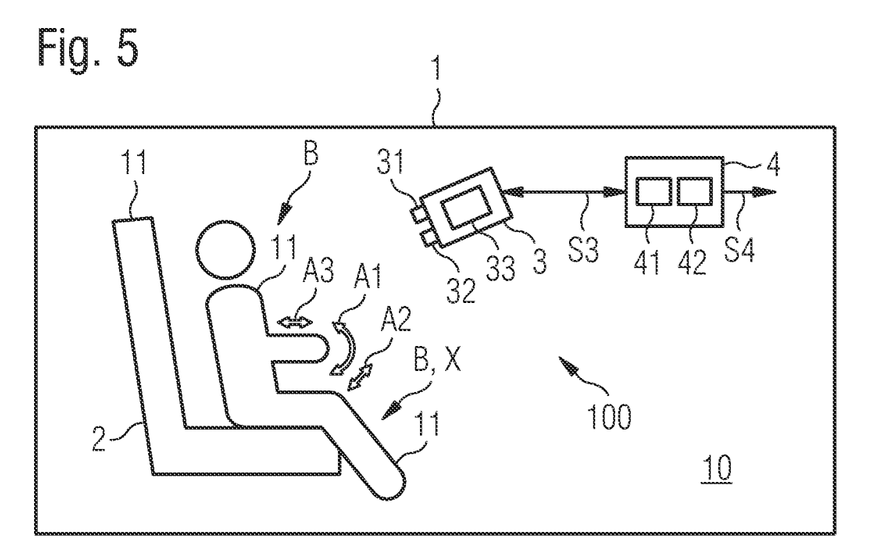
FIG. 5 shows the vehicle shown in FIG. 1 during a further step of the method in accordance with an embodiment of the invention.

As is shown by way of example in FIG. 5, a person or in general a living being L performs particular movements. For example, a person regularly moves his arms, as symbolised by arrow A1 in FIG. 5, his legs, as symbolised by arrow A2 in FIG. 5, or his head. Further, in mammals and people, the ribcage moves as a result of breathing, as is indicated by arrow A3 in FIG. 5. An object X in the form of an item is typically stationary or only moves in the form of vibrations, which are transmitted to the object X via the vehicle 1. Thus, the processing device 4 can determine from the detected movements A1, A2, A3 of the object X whether the detected object X is a living being B.

The detection of movements A1, A2, A3 of the object X now only takes place under the condition that the presence of an object X has been established during the distance determination. This has the advantage that simple, rapid detection of an object can take place using comparatively simple means, and complex detection of movements is only carried out when it is required. This improves the reliability and efficiency of the method.

Optionally, the detection of movements A1, A2, A3 of the object X may be linked to the further condition that the determined size of the object X is less than a reference value for the size. As can be seen from a comparison of FIGS. 3, 4 and 5, a baby sitting in a child seat (FIG. 4) is smaller than the suitcase shown in FIG. 3 or the adult person shown in FIG. 5. Assuming that objects X in the form of items such as suitcases, boxes or the like can be left behind in the interior 10 of the vehicle 1 and that adult people usually stay behind in the interior 10 of their own volition, during the detection of these objects X it may be irrelevant for further steps, for example the generation of a warning signal by the vehicle 1 to notify the driver or another responsible person of the occupancy of the seat 2, whether or not the detected object X is a living being L. This further improves the efficiency of the method.

Optionally, the reflected electromagnetic waves or the sensor signals S3 may moreover be filtered on the basis of the determined size of the object X. The filtering may for example take place using band-pass filters or the like, it being possible for the corresponding filters to be implemented either in analogue in the evaluation unit 33 or in digital as software stored in the data memory 41. For example, it may be determined in tests which movements are typical of people or children of a particular age and thus of approximately a particular external constitution and size, and which sensor signals S3 result from this. From the determined size, it can thus be predetermined by the detection device 4 which information contained in the sensor signals S3, for example in the form of frequencies of the relative speed between the object X and the sensor device 3, should be filtered. The movements A1, A2, A3 of the object X are subsequently detected from the filtered reflected waves R or sensor signals S3 by means of the detection device 4.

Figure 6:
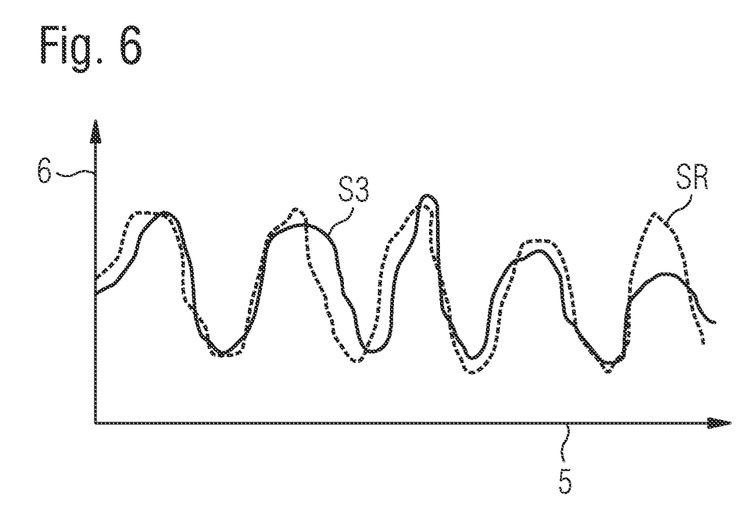
FIG. 6 shows the step of determining whether a detected object is a living being in accordance with an embodiment of the invention.

To determine whether the detected object X is a living being B, the detection device 4 may analyse the reflected electromagnetic waves R or the sensor signals S3 in the time domain for the presence of particular patterns. This is shown schematically by way of example in FIG. 6. FIG. 6 is a graph of a progression of the sensor signal S3 over time. In FIG. 6, time is plotted on the x-axis 5 and a signal variable of the sensor signal S3 is plotted on the y-axis 6. The signal variable may for example represent a relative speed or an absolute distance or another movement variable. The detection device 4 compares this progression over time of the optionally filtered sensor signal S3 with a reference progression or a reference pattern SR, which represents a particular known type of movement of an object X or living being L. For example, it has been found that the movement of the ribcage produced by breathing generates a signal progression pattern which is regular, or periodic with a frequency in a particular range. Using known pattern recognition algorithms, the processing device 4 can determine whether the progression of the sensor signal S3 corresponds to or is close to a known reference pattern SR. For this purpose, by way of example, a plurality of reference patterns SR may be stored in the data memory 42 of the detection device 4, for example reference patterns which represent breathing movements of people in predetermined age ranges, such as between 0 years and 1 year, between 1 year and 2 years, between 2 years and 3 years, between 3 years and 5 years, between 5 years and 10 years, or older than 10 years. Reference patterns which represent a breathing movement of different pets such as dogs or cats may also be stored in the data memory 42 of the processing device 4.

Figure 4:
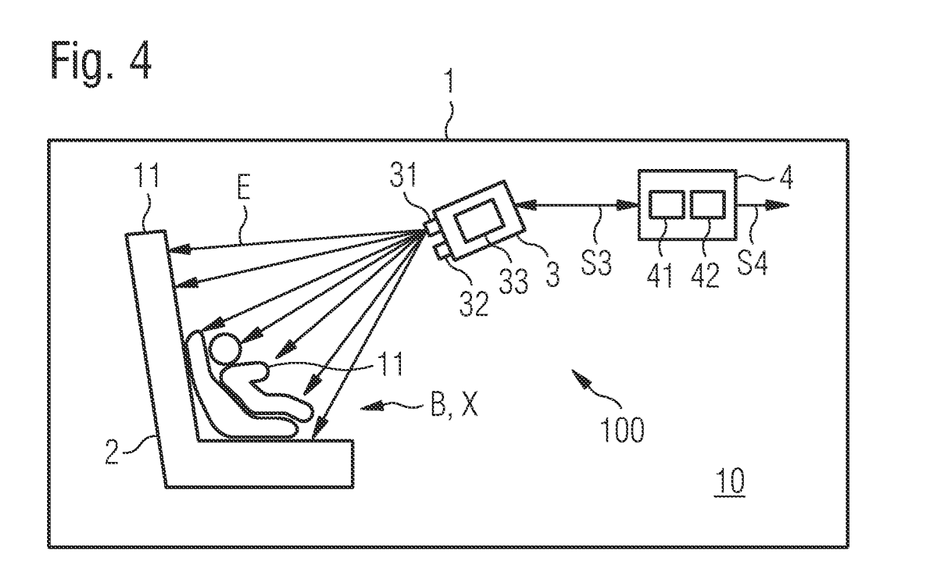
FIG. 4 shows the vehicle shown in FIG. 1 during a further step of the method in accordance with an embodiment of the invention.

If the detection device 4 has determined that the detected object is a living being L, a detection signal S4 is outputted by the detection device 4, as is shown symbolically in FIGS. 4 and 5. The detection device 4 may for example generate an electrical signal as a detection signal S4 and provide it to a communications interface (not shown). Using the detection signal S4, for example a warning device (not shown) such as a control light for generating a visual, acoustic or haptic warning signal may be brought about. If the detection device 4 determines that the detected object X is not a living being L, a base signal S5 may be outputted by the detection device 4, for example in the form of an electrical voltage less than a threshold, as is shown symbolically in FIG. 3.

Although the present invention has been fully described by way of preferred embodiments in the above, it is not limited thereto, but rather can be modified in a variety of ways.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS

1 Vehicle
2 Seat
2a Surface of a backrest of the seat
2b Seat surface region
3 Sensor device
4 Detection device
5 x-axis
6 y-axis
10 Interior
11 Surface
31 Radiator
32 Sensor
33 Evaluation unit
41 Processor
42 Data memory
100 Detection arrangement
A1-A3 Movements
B Living being
d0 Reference distance
d1 Determined distance
E Emitted electromagnetic waves
S3 Sensor signals
S4 Detection signal
S5 Base signal
SR Reference pattern
R Reflected electromagnetic waves
X Object While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of detecting a living being disposed on a seat of a vehicle, the method comprising:
    emitting electromagnetic waves at a predetermined frequency or at a predetermined frequency band towards the seat by means of an electromagnetic radiator;
    receiving reflected electromagnetic waves reflected from a surface by means of a sensor;
    detecting an object disposed on the seat based on a transit time of the emitted electromagnetic waves and the reflected electromagnetic waves between the electromagnetic radiator, the surface and the sensor by means of a detection device;
    detecting movement of the object from the reflected electromagnetic waves by means of the detection device if the object has been detected;
    determining whether the detected object is a living being based on the detected movements of the object;
    outputting a detection signal from the detection device in response to determining that the detected object is a living being,
    wherein the detecting the object step includes determining a size of the object based on the reflected electromagnetic waves, and
    filtering the reflected electromagnetic waves based on the determined size of the object and wherein the detecting movement step includes the filtering of the reflected electromagnetic waves.

2. The method of claim 1, further comprising determining an area occupied by the object by comparing reflected electromagnetic waves from an occupied area with reflected electromagnetic waves from a reference area.

3. The method of claim 2, wherein the determining an area occupied by the object step includes determining a size of the object by comparing the reflected electromagnetic waves from the occupied area with reflected electromagnetic waves from the reference area.

4. The method of claim 1, wherein the detecting movement steps includes determining a size of the object being less than a reference size value.

5. The method of claim 1, wherein the detecting movement step includes determining a relative speed of the emitted electromagnetic waves with respect to the reflected electromagnetic waves.

6. The method of claim 5, wherein the detecting movement step includes determining a frequency shift of the emitted electromagnetic waves with respect to the reflected electromagnetic waves.

7. The method of claim 1, wherein determining whether the detected object is a living being step includes analyzing the reflected electromagnetic waves in a time domain to detect predetermined patterns.

8. The method of claim 7, wherein the predetermined patterns are associated with breathing movement of one or more people within a predetermined age range or breathing movements of one or more pets.

9. The method of claim 1, wherein the emitting step includes modulating the electromagnetic waves in a range between 77 GHz and 81 GHz.

10. A detection arrangement for use in a vehicle including at least one seat for use by a person, the detection arrangement comprising:
    an electromagnetic radiator configured to emit electromagnetic waves at least one frequency or within at least one frequency band;
    a sensor configured to receive reflected electromagnetic waves reflected from a surface within the vehicle;
    a detection device connected to the sensor and the electromagnetic radiator, wherein the detection device is configured to detect an object disposed on the seat, wherein the detection device is configured to detect a size of the object based on the reflected electromagnetic waves; and
    a filter configured to filter the reflected electromagnetic waves based on the determined size of the object.

11. The detection arrangement of claim 10, wherein the electromagnetic radiator includes a radar transmitter configured to emit radio waves or microwaves, and wherein the sensor is configured to receive reflected radio waves or reflected microwaves, each reflected from the seat, the object, or the person.

12. The detection arrangement of claim 10, wherein the electromagnetic radiator includes an ultrasonic transmitter configured to emit electromagnetic waves within an ultrasonic frequency range, and wherein the sensor is configured to receive reflected electromagnetic waves ultrasound waves within the ultrasonic frequency range.

13. The detection arrangement of claim 10, wherein the electromagnetic radiator includes a lighting unit configured to emit light within an infrared frequency range, and wherein the sensor includes a photonic mixer detector configured to receive reflected light within the infrared frequency range.

14. A method of detecting occupancy in a vehicle, the method comprising:
    emitting electromagnetic waves at a predetermined frequency from an electromagnetic radiator towards a seat disposed in the vehicle;
    receiving, by a sensor, reflected electromagnetic waves reflected from a surface;
    comparing, by a processor, a first distance traveled by the electromagnetic waves to a second distance traveled by the reflected electromagnetic waves to determine whether a person, or an object, or a pet is disposed on the seat;
    further comprising comparing a first number of reflected electromagnetic waves reflected from a surface of the seat to a second number of reflected electromagnetic waves reflected from the person, or the object, or the pet to determine a size of the person, or the object, or the pet and,
    filtering the reflected electromagnetic waves based on the determined size of the person, object or pet, and
    detecting a movement of the person, the object or the pet from the filtered reflected electromagnetic waves or sensor signals by means of a detection device.

15. The method of claim 14, further comprising measuring a first speed of a first reflected electromagnetic wave reflected from the surface of the seat to a second speed of a second reflected electromagnetic wave reflected from the person, or the object, or the pet to determine whether the person, or the object, or the pet is moving.

16. The method of claim 14, further comprising:
    receiving, by the processor from the sensor, a signal progression pattern indicative of an absolute distance between the person, or the object, or the pet and the sensor within a first period, or movement of the person, or the object, or the pet with respect to the sensor within a second period; and
    comparing the signal progression pattern to a stored reference pattern.

17. The method of claim 14, further comprising receiving an adjustment position of the seat and altering the first distance traveled by the electromagnetic waves based on the adjustment position of the seat.

* * * * *